(12) United States Patent
Ventura

(10) Patent No.: US 7,275,395 B1
(45) Date of Patent: Oct. 2, 2007

(54) METHOD AND APPARATUS FOR MAKING DRY ICE

(75) Inventor: Mark Ventura, Huntington Beach, CA (US)

(73) Assignee: Ventura Entreprises, Huntington Beach, CA (US)

( * ) Notice: Subject to any disclaimer, the term of this patent is extended or adjusted under 35 U.S.C. 154(b) by 409 days.

(21) Appl. No.: 10/942,746

(22) Filed: Sep. 15, 2004

(51) Int. Cl.
*F25J 1/00* (2006.01)

(52) U.S. Cl. .......................................... 62/604; 62/602

(58) Field of Classification Search ................ 62/602, 62/604, 384
See application file for complete search history.

(56) References Cited

U.S. PATENT DOCUMENTS

| 1,620,999 A | 3/1927 | Cook | |
|---|---|---|---|
| 1,768,059 A | 6/1930 | Hassensall | |
| 1,870,691 A * | 8/1932 | Rust et al. | 62/604 |
| 1,876,266 A * | 9/1932 | Weston | 62/604 |
| 1,920,526 A * | 8/1933 | Rudd | 62/604 |
| 1,963,743 A * | 6/1934 | Hoodless | 62/372 |
| 2,096,584 A * | 10/1937 | Hill | 62/604 |
| 2,155,956 A * | 4/1939 | Planer | 62/602 |
| 2,217,169 A * | 10/1940 | Hill | 62/602 |
| 2,307,013 A * | 1/1943 | Batzle | 62/603 |
| 4,374,658 A * | 2/1983 | Kawaguchi | 62/604 |
| 4,916,922 A | 4/1990 | Mullens | |
| 5,148,670 A | 9/1992 | Birch et al. | |
| 5,528,907 A | 6/1996 | Pint et al. | |
| 6,058,714 A * | 5/2000 | Takasugi | 62/50.1 |

* cited by examiner

*Primary Examiner*—William C Doerrler
(74) *Attorney, Agent, or Firm*—Robert D. Buyan; Stout, Uxa, Buyan & Mullins, LLP

(57) ABSTRACT

An apparatus for producing dry ice is provided. The apparatus generally includes an expandable shell assembly, an expansion control assembly for controlling expansion of the expandable shell assembly, and a delivery system for delivering liquid carbon dioxide from a supply of liquid carbon dioxide to the dry ice chamber. The expandable shell assembly is made of multiple separable shell portions and an inner surface of at least one of the shell portions forms a wall of the dry ice chamber. The expandable shell assembly is structured to automatically relieve pressure within the dry ice chamber when the dry ice chamber has been sufficiently filled with a mass of dry ice.

33 Claims, 6 Drawing Sheets

METHOD AND APPARATUS FOR MAKING DRY ICE

FIELD OF THE INVENTION

The present invention generally relates to devices and methods for making dry ice and articles containing dry ice, and more specifically relates to devices and methods for making dry ice carbon dioxide which is easily constructed in a convenient size and/or shape using a portable, light weight dry ice machine of the present invention.

BACKGROUND OF THE INVENTION

Liquefied carbon dioxide is a cryogenic fluid that is stored in a liquid state under high pressure. When liquefied carbon dioxide is brought into a low pressure environment, such as less than 70 psig, the liquid, through the process of adiabatic expansion, assumes a crystalline form commonly called carbon dioxide snow or dry ice. With time and the absorption of heat, dry ice sublimes to its normal gaseous state. Because the dry ice absorbs large quantities of heat during the sublimation process, it is used in place of ice for cooling substances and/or for keeping a substance in a frozen state.

The process of allowing liquid carbon dioxide to be injected into a space at a low pressure to produce dry ice has been known for many years. Small, manually operated dry ice making devices have also been in use for some time (see Burns et al, U.S. Pat. No. 1,620,999, and Hassensall, U.S. Pat. No. 1,768,059).

A more recent patent disclosing an apparatus for making dry ice is Kawaguchi, U.S. Pat. No. 4,374,658. Kawaguchi discloses a small, portable device for producing and collecting dry ice crystals to produce a relatively small square or rectangular shaped mass of relatively low density dry ice. However, it is often desirable to maximize the density of dry ice in order to extend the time required to convert the solid dry ice to gaseous carbon dioxide.

Complex and relatively expensive devices are commercially available for producing large blocks of dry ice which are usually sold in slab or pellet form by commercial ice dealers. Although there are many practical applications for relatively small quantities of dry ice, for example, keeping foods or small items (e.g. biological specimens) cold for an extended period of time, conventional systems are generally impractical and/or prohibitively expensive for an individual or a small business to use and own. In addition, due to the extremely cold temperature (−78.5° C., or −109.3° F.) of solid carbon dioxide, manual handling of dry ice exposes the operator to potential injury from physical contact therewith.

Other examples of conventional dry ice making systems include those described in Eve, U.S. Pat. No. 5,148,670, Mullens, U.S. Pat. No. 4,916,922, and Pint et al., U.S. Pat. No. 5,528,907, the entireties of each of which are expressly incorporated herein by this specific reference.

In view of the shortcomings and limitation of the prior art, there exists a need for new and improved methods and apparatus for making dry ice.

SUMMARY OF THE INVENTION

The present invention provides portable, safe, highly effective apparatus for producing solidified carbon dioxide, commonly known as "dry ice." The present invention additionally provides systems and methods for making useful articles containing dry ice and systems and methods for encapsulating articles within dry ice.

In accordance with one embodiment of the present invention, there is provided an apparatus for producing dry ice, the apparatus generally comprising an expandable shell assembly, an expansion control assembly for controlling the expansion of the expandable shell assembly, and a delivery system for delivering liquid carbon dioxide from a supply of liquid carbon dioxide to the dry ice chamber.

Further in accordance with the invention, the expandable shell assembly may comprise a plurality of separable shell portions, an inner surface on at least one of said separable shell portions defining a dry ice chamber, interfaces between the separable shell portions, and at least one self-relieving seam disposed on at least one of said interfaces, said at least one self relieving seam being effective to allow expansion of the expandable shell assembly during the dry ice making process.

Still further in accordance with the invention, the expandable shell assembly may be structured to maintain sufficient pressure within the dry ice chamber in order to enhance formation of a solid, relatively dense mass of dry ice. Moreover, by means of the self-relieving seams, the expandable shell assembly is structured to automatically relieve pressure within the dry ice chamber when the dry ice chamber has been sufficiently filled with the mass of dry ice. The apparatus in accordance with the present invention is structured such that, unlike conventional dry ice making systems, no pressure gauge and/or pressure relief valve is required for effective use of the apparatus.

Still further in accordance with the invention, the expandable shell assembly may be structured to assume a first position wherein the at least one self relieving seam is in a substantially closed position that allows a relatively small or no passage of carbon dioxide gas therethrough, and a second position wherein the at least one seam is in a substantially open position that allows a relatively larger passage of carbon dioxide gas therethrough. In other words, the expandable shell assembly is structured to assume a first position that is a substantially "non-venting" position, and a second position that is a "venting" position.

In addition, the apparatus preferably further comprises means for controlling movement of the expandable shell assembly from said first position to said second position, for example, by maintaining the expandable shell assembly in the first position during the filling of the dry ice chamber with solid and gaseous carbon dioxide, and, at an appropriate moment during the filling, allowing the expandable shell assembly to transition to the second position. For example, the apparatus may be structured such that the expandable shell assembly is typically arranged in the first (substantially non-venting) position during the filling of the dry ice chamber, and is transitioned to the second (venting) position in response to a predetermined pressure being reached in the dry ice chamber.

Still further in accordance with the invention, the apparatus may further comprise structure(s) for maintaining incoming liquid carbon dioxide in substantially a liquid state until the liquid carbon dioxide has entered the dry ice chamber. For example, the apparatus may further comprise a heat exchange chamber within the expandable shell assembly, in which incoming carbon dioxide liquid is cooled by carbon dioxide gasses venting from the dry ice chamber. More specifically, for example, the delivery system may include a thermally conductive conduit, for example a copper conduit, disposed within the heat exchange chamber and positioned to be exposed to carbon dioxide gas venting from the dry ice chamber. For example, the thermally conductive conduit may comprise a thermally conductive coil disposed generally above the dry ice chamber.

Still further in accordance with the invention, the heat exchange chamber may be configured as a defined channel of space at least partially surrounding the thermally conductive coil, that is effective to concentrate cool vapor around the coil. For example, the heat exchange chamber may comprise a generally cylindrical space defined between an inner cylindrical wall and an outer cylindrical wall. In this embodiment of the invention, the thermally conductive coil is located within the cylindrical space such that cooling vapors passing into the space are effectively concentrated around the coil.

Still further in accordance with the invention, a high pressure conduit that is optionally thermally insulated may be provided between the source of liquid carbon dioxide and the expandable shell assembly. Such thermally insulated conduit may be made of a flexible tubing made of a suitable high strength copolymer, for example a copolymer of Ethylene-tetraflouroethylene (ETFE), more particularly a material having the tradename TEFZEL® available from DuPont.

Still further in accordance with the invention, at least a portion of the dry ice chamber may include, or may be fully or partially formed of, a gas permeable material to permit venting of carbon dioxide gas from the chamber during the dry ice making process. For example, the material may comprise a porous or otherwise permeable media effectively positioned and structured to allow venting of carbon dioxide gas from the chamber while remaining substantially or entirely impermeable to carbon dioxide crystals.

Still further in accordance with the invention, the dry ice chamber is generally centrally located within the expandable shell assembly. An insulating space may be provided between the dry ice chamber and an outer wall of the expandable shell assembly. The insulating space at least partially surrounds, and more preferably entirely circumscribes or surrounds at least the side walls of the dry ice chamber.

Still further in accordance with invention, the apparatus may be configured or constructed so as to control the venting of the carbon dioxide gas formed during the dry ice making process. For example, in one especially advantageous embodiment of the invention, the insulating space surrounding the dry ice chamber functions as a highly effective venting chamber for directing carbon dioxide gas from the dry ice chamber into the heat exchange chamber to provide cooling of the thermally conductive coil conduit disposed therein.

Still further in accordance with the invention, the venting chamber may include a plurality of spaced apart ribs, defining a plurality of venting passages therebetween. More specifically, the ribs may extend radially between the dry ice chamber and an outer wall of the expandable shell assembly. The venting chamber and ribs may extend along an entire length of the dry ice chamber such that the dry ice chamber will continue to allow venting of carbon dioxide gas while the chamber is being filled with carbon dioxide crystals.

Still further in accordance with the invention, the apparatus may be configured or constructed to provide a block of solid carbon dioxide without the need for direct manual handling of the block, and/or without the need to remove the block from the apparatus. For example, nearly the entire apparatus may be manufactured of strong, lightweight, low cost materials and may be designed to be disposed of after a single use or shipped to a remote destination along with the dry ice contained there in and, thereafter, optionally returned for re use after the dry ice has been used. Thus, the block of carbon dioxide held in the dry ice chamber does not need to be removed from the apparatus in order to be useful, but advantageously, can be utilized in situ.

Still further in accordance with the invention, the apparatus may be designed to be efficient and effective in producing a substantially solid, dense mass of solid carbon dioxide.

Still further in accordance with the invention, the apparatus includes no conventional pressure relief valve for venting carbon dioxide gas from the interior of the device after dry ice has substantially filled the interior of the device.

Still further in accordance with the invention, the expandable shell assembly may be made entirely or partially disposable materials. For example, the expandable shell assembly may be made almost entirely of lightweight, thermally insulating, disposable materials, for example but not limited to, an expanded polystyrene foam. The apparatus does not require, and in some embodiments may not include, standard pressure relieving valves or meters. For example, the expandable shell assembly may comprise a plurality of separable shell portions that can be assembled to form an expandable shell assembly that has an arrangement of seams at intersections of the separable shell portions. In a specific embodiment of the invention, the expandable shell assembly comprises an upper shell portion containing the heat exchange chamber, an intermediate shell portion containing the dry ice chamber, and a base portion. More specifically, the intermediate shell portion may comprise a clamshell-like configuration. The self-relieving seams may be substantially sealed during the dry ice making process until a pressure is reached within the dry ice chamber that is sufficient to cause the separable shell portions to separate and assume the second (venting) position, thereby opening the self-relieving seams and allowing an escape of carbon dioxide gas. Advantageously, the apparatus is designed such that this transition pressure is reached when the dry ice chamber has been filled to a desired capacity, more specifically, when the dry ice chamber contains a relatively high density mass of solid carbon dioxide crystals at a desired volume. The apparatus of the present invention is designed such that the release of the carbon dioxide gas is usually visible to an operator of the device, thereby providing an indication that the dry ice making process has been completed.

Still further in accordance with the invention, the expandable shell assembly may include a venting chamber in fluid communication with the dry ice chamber, wherein the venting chamber is preferably disposed circumferentially around the dry ice chamber. For example, the venting chamber includes a plurality of radially disposed ribs defining slots therebetween. The venting chamber may be disposed adjacent to all or a portion of the dry ice chamber in order to allow venting of carbon dioxide gas during filling of the dry ice chamber. The apparatus may further comprise a porous media disposed between the dry ice chamber and the venting chamber. More particularly, the porous media may comprise a media permeable to carbon dioxide gas and substantially impermeable to solidified carbon dioxide crystals.

Still further in accordance with the invention, the device may include an expansion control assembly designed to permit expansion of the expandable shell assembly during the dry ice making process. Such expansion control assembly may provide an effective means, without the use of conventional pressure relief valves or meters or gauges, for providing an indication to a user that the process of forming dry ice in the dry ice chamber is complete or substantially complete, and the dry ice is ready for use. The expansion control assembly may additionally comprise a fastening member disposed along the at least one self-relieving seam. In a particular embodiment of the invention, the fastening member may cover at least one self-relieving seam. The fastening member may comprise a hook and loop fastening system extending along at least a portion of the at least one self-relieving seam. For example, adjacent shell portions of the expandable shell assembly may include coverings made of a "looped surface" of a Velcro® fastener. Accordingly, the self relieving seam may be covered along at least a portion thereof, with a strip made of a "hooked surface" of a Velcro® fastener. During the dry ice making process the hook and loop fastener maintains the seam in the first (substantially non-venting) position, although there may be some pulling apart of the seam or negligible separation as pressure in the expandable shell assembly increases. Once pressure within the expandable shell assembly increases to a desired level, the hook and loop fastener allows the seam to separate to the second (venting) position, thereby allowing a substantial amount of carbon dioxide gas to escape, usually at a visible level, indicating to a user that the dry ice making process is complete or at least substantially reaching completion. Consequently, the release of this carbon dioxide gas relieves pressure within the dry ice chamber and prevents bursting thereof. The visible carbon dioxide gas at the right moment provides a highly useful, highly reliable indication to a user that the supply of carbon dioxide liquid may be disconnected from the apparatus as the dry ice making process has been completed.

Still further in accordance with the invention, the plurality of separable shell portions comprises an upper portion containing a heat exchange chamber, an intermediate portion containing the dry ice chamber, and the at least one self-relieving seam is disposed between the upper portion and the intermediate portion. Even more specifically, the intermediate portion preferably comprises at least two subportions divided by another self-relieving seam wherein the self-relieving seam bisects, or divides into two subportions, the intermediate portion of the expandable shell assembly. The intermediate portion may have a clamshell like configuration, with the inner surface of the subportions being made of the porous material described elsewhere herein and defining a surface of the dry ice chamber.

Still further in accordance with the invention, there is provided a method for making an article that consists of, comprises or is fully or partially encased or encapsulated in dry ice. Such method comprises the steps of providing an expandable shell assembly including a chamber for containing dry ice, and at least one seam in communication with the chamber and the expandable shell assembly being constructed to alternately assume a first position in which the at least one seam is substantially closed and a second position in which the at least one seam is substantially open. For example, the method may comprise providing an expandable shell assembly as substantially described elsewhere herein with respect to the apparatus of the present invention. The method further comprises the step of passing a flow of liquid carbon dioxide into said chamber while the expandable shell assembly is in said first position and allowing the liquid carbon dioxide to form carbon dioxide crystals within the chamber by adiabatic expansion thereof. The method further comprises the steps of allowing the carbon dioxide crystals to fill the chamber, until a desired volume of carbon dioxide crystals is reached therein and allowing pressure to increase in the chamber by maintaining the expandable shell in said first position in which only a small amount of carbon dioxide gas is vented from the apparatus, until the desired volume of carbon dioxide crystals is reached in the chamber. Furthermore, the method comprises the steps of, upon the desired volume of carbon dioxide crystals being reached in the chamber, allowing the expandable shell assembly to be automatically moved to a second position in which more carbon dioxide gas is vented from the apparatus, and concurrently or subsequently terminating the step of passing the flow of liquid carbon dioxide into the chamber in order to obtain an article containing dry ice. The method may further include the step of removing the mass of dry ice by pulling apart the expandable shell assembly to reveal the mass of dry ice therein.

The present invention may also provide methods of manufacturing products to be shipped in a frozen state, wherein such a product comprises an article or item encapsulated by dry ice. For example, in many circumstances, it is desirable or necessary to maintain an article in a chilled or frozen state for an extended length of time. Examples of such articles include, but are not limited to, a biological specimen, certain drugs, a perishable food, etc. The methods generally comprise the steps of mounting or positioning the article within the chamber of an apparatus such as the apparatus of the invention described elsewhere herein, and passing a liquid carbon dioxide into the chamber. Dry ice thus forms around or about the article, thereby fully or partially encapsulating or encasing the article in dry ice. The product may thereafter be removed from the assembly and stored and/or shipped in a frozen state as desired.

The invention together with additional features and advantages thereof may be best understood by reference to the following detailed description taken in connection with the accompanying illustrated Drawings.

DETAILED DESCRIPTION

Set forth herebelow are detailed descriptions of certain embodiments and examples of the apparatus and methods for making dry ice and products containing and/or encapsulated within dry ice in accordance with the present invention.

Figure 1:
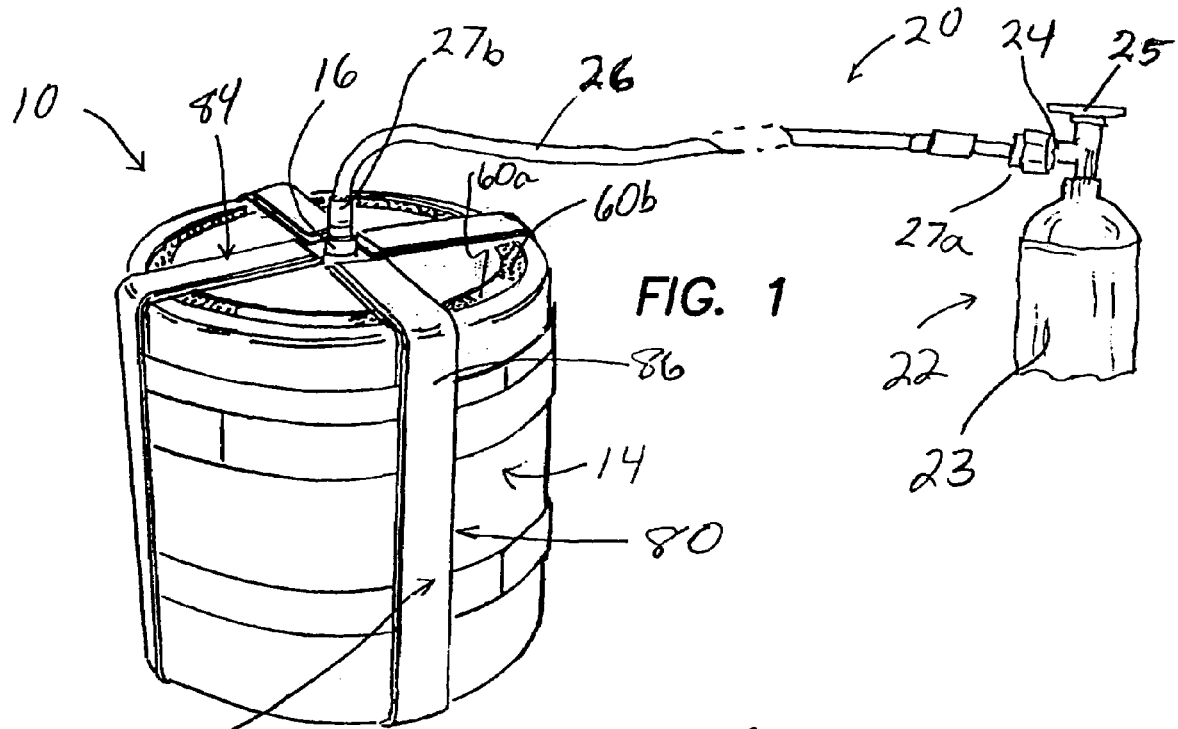
FIG. 1 is a perspective view of an apparatus in accordance with the present invention for making dry ice, the apparatus including an expandable shell assembly comprising a plurality of separable shell portions, an inlet conduit, and hook and loop fasteners for controlling expansion of the separable shell portions during the dry ice making process, the apparatus being suitable for performing a method of the present invention.
Figure 2:
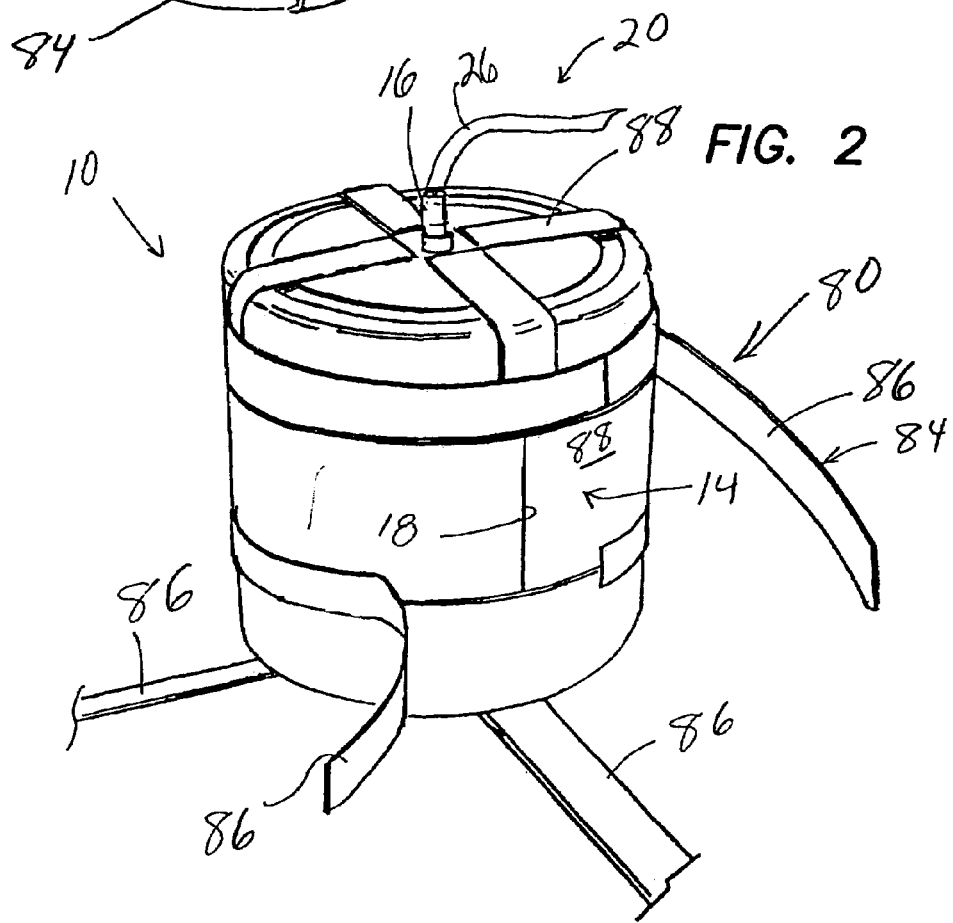
FIG. 2 is a perspective view of the apparatus shown in FIG. 1, with an inlet conduit removed therefrom, and with hook and loop fasteners being partially removed to reveal self relieving seams.

Turning now to FIGS. 1 and 2, an apparatus 10 in accordance with the present invention is shown, wherein the apparatus 10 generally comprises an expandable shell assembly 14 including an inlet line 16, a dry ice chamber (not shown in FIG. 1) in communication with the inlet line 16, and at least one self-relieving seam 18 (shown in FIG. 2) that is effective to allow expansion of the expandable shell assembly 14 in order to release carbon dioxide gas from the dry ice chamber when the dry ice chamber has been sufficiently filled with solidified carbon dioxide and carbon dioxide gas.

The apparatus 10 may further comprise a delivery system 20 for delivering liquid carbon dioxide from a source or supply 22 of liquid carbon dioxide to the dry ice chamber. The supply 22 of liquid carbon dioxide may comprise a conventional, high pressure carbon dioxide cylinder 23 containing liquid and gaseous carbon dioxide, the cylinder 23 including a conventional siphon 24 and valve 25. Also, in some embodiments of the invention, low pressure and/or low temperature carbon dioxide (e.g., low temperature carbon dioxide stored in an insulated container) may be used as the supply 22 of liquid carbon dioxide.

In the embodiment of the invention shown in FIGS. 1 and 2, the apparatus 10 is structured to be operated without a pressure gauge or conventional pressure relief valve and preferably includes no pressure gauge and/or conventional pressure relief valve connected between the expandable shell assembly 14 and the supply 22 of liquid carbon dioxide. This is an important feature of this particular embodiment of the invention in that, as will be described in greater detail hereinafter, the apparatus 10 is designed to require very few operating steps, little or no "guess work" or monitoring on the part of the operator. In addition, the apparatus 10 is designed to automatically, and preferably in a visible manner, provide a clear indication to the operator when the dry ice chamber is being sufficiently filled with a relatively dense mass of dry ice.

In some embodiments the delivery system 20 may include features to enhance effectiveness of the delivery of liquid carbon dioxide to the dry ice chamber with little or no phase change in any substantial portion of the carbon dioxide liquid prior to the liquid reaching the dry ice chamber. In other words, the apparatus 10 may be configured and constructed such that, when liquid carbon dioxide is being transferred from the supply 22 to the dry ice chamber, the liquid carbon dioxide will undergo little or no phase change and will thus remain substantially liquid until it has entered the dry ice chamber. It will be appreciated by those of skill in the art that these features may enhance efficiency and effectiveness of the apparatus 10 by maintaining the carbon dioxide in a substantially liquid state until the carbon dioxide has entered the dry ice chamber, thereby allowing the apparatus to yield more dry ice per unit mass of liquid carbon dioxide, than conventional systems that do not include such features. One such feature may be a high strength conduit 26 that is capable of withstanding substantially the full pressure of liquid carbon dioxide at room temperature removably connected between the supply 22 of liquid carbon dioxide and the inlet line 16. Such high pressure conduit 26 may include suitable connectors 27a and 27b for connecting the conduit 26 to and between the cylinder 23 and inlet line 16 respectively. Connector 27a may comprise a CGA fitting. Connector 27b preferably comprises a suitable "quick disconnect" fitting that is able to withstand the full pressure of liquid carbon dioxide at room temperature. In an especially advantageous embodiment of the invention, the conduit 26 may be made of a flexible, polymeric tubing made of a suitable high strength material, preferably having low thermal conductive properties. Unlike prior art dry ice making devices which typically require the use of high pressure tubing (e.g., metal tubing or metal braided tubing) for transferring liquid carbon dioxide from a cylinder to a point of use, the apparatus of the present invention may use any type of tubing that is made of a material having sufficient strength to withstand and/or maintain an internal pressure of at least 800 p.s.i. (the pressure of liquid carbon dioxide at room temperature being about 800 p.s.i.) and more preferably about 1000 p.s.i. Thus, the conduit 20 of the present invention can, in at least some embodiments, be free of any metal reinforcement wires or braiding.

In addition, the conduit 26 is preferably translucent or transparent or will otherwise allow clear visual observation of a passage of the liquid carbon dioxide through the conduit. In a preferred embodiment of the invention, the conduit 26 comprises a TEFZEL® tubing having an outer diameter of about ⅛ of an inch, an inner diameter of about 0.065 of an inch, and a wall thickness of about 0.030 of an inch. TEFZEL® is a trademark of Dupont, Inc. for a modified copolymer of tetrafluoroethylene and ethylene that provides excellent resistance to attack by chemicals and solvents and thus will resist deterioration. Advantageously, the TEFZEL® tubing conduit 26, because it operates at such a high pressure, inhibits expansion of the carbon dioxide prior to the carbon dioxide expanding in the dry ice chamber.

It is noted herein that conventional, prior art dry ice making apparatus typically utilize transfer hoses that allow more significant phase change of carbon dioxide within the hose as the liquid carbon dioxide is being transferred to an expansion chamber, thus turning the transfer hose into a "heat exchanger" which cools the hose and allows heat to enter the carbon dioxide flowing therethrough. This heat changes the thermodynamic state of the carbon dioxide and lowers the amount of dry ice formed in the expansion chamber of the conventional system.

Figure 3:
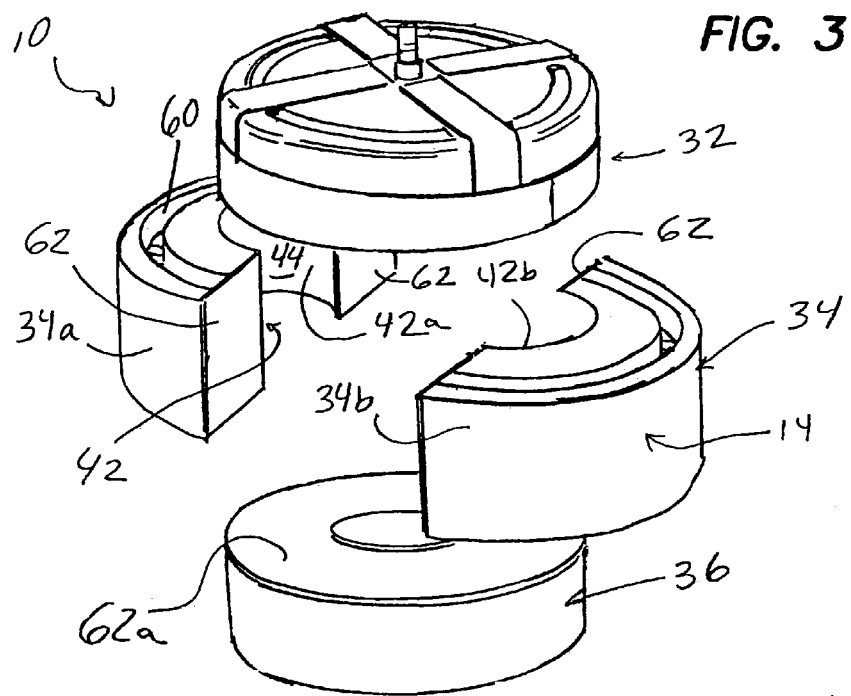
FIG. 3 is another perspective view of the apparatus shown in FIG. 1, showing the separable shell portions in a spaced apart relationship.

Turning now to FIG. 3, the expandable shell assembly 14 is shown, by means of an exploded view, to comprise a plurality of separable shell portions, for example, an upper shell portion 32, an intermediate shell portion 34, which preferably comprises separable intermediate subportions 34a and 34b as shown, and base portion 36. Each of these separable shell portions 32, 34a, 34b, 36 are preferably comprises a strong, lightweight, inexpensive, highly thermally insulating material, for example, expanded polystyrene or other suitable material.

Figure 4:
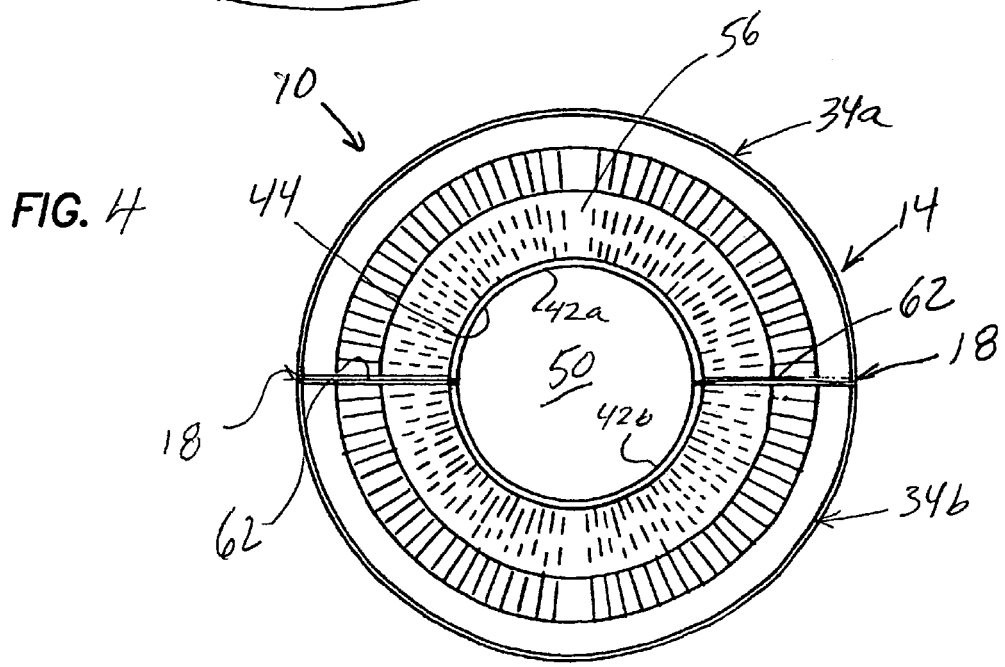
FIG. 4 is a top plan view of an intermediate shell portion of the expandable shell assembly shown in FIG. 1, showing the dry ice chamber and a venting chamber circumscribing the dry ice chamber and including radially disposed ribs.

The dry ice chamber 50, in this particular embodiment of the invention, is bounded by inner walls 42 of the intermediate shell portion 34. More specifically, intermediate shell subportions 34a and 34b may each include a contoured inner surface 42a and 42b respectively, preferably comprising a porous material 44. Thus, it can be appreciated that when the intermediate shell subportions 34a and 34b are assembled as shown in FIG. 4, inner walls 42a and 42b define a substantially cylindrical periphery of the dry ice chamber 50. Dry ice chamber 50 is shown located generally centrally within the expandable shell assembly 14, and is preferably at least partially, preferably substantially entirely, circumscribed by a venting chamber 56, to be described in greater detail hereinafter.

Figure 5A:
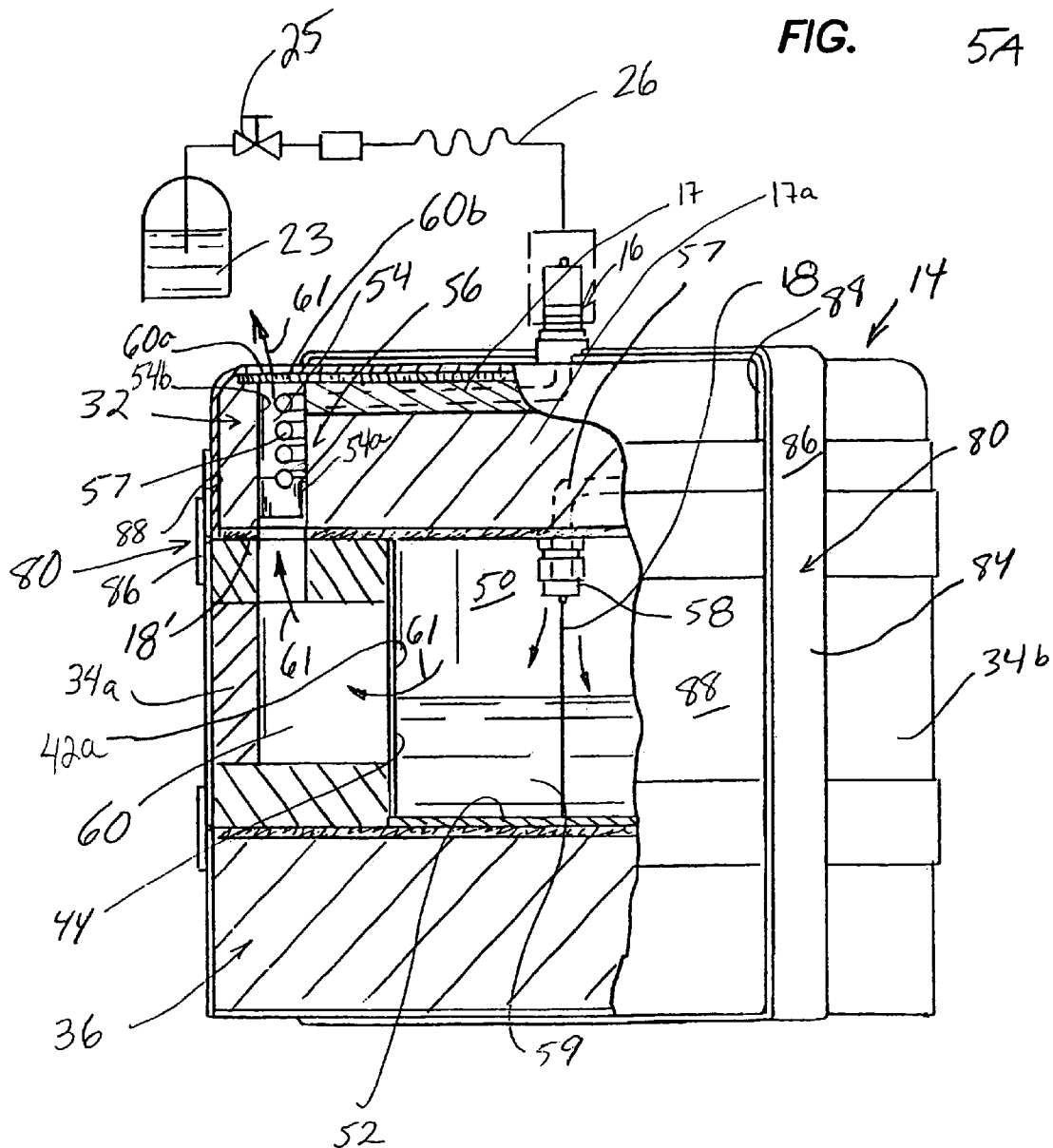
FIG. 5A is a partially cutaway perspective view of the apparatus shown in FIG. 1 showing the expandable shell assembly in a first (non-venting) position while the dry ice chamber is filling with carbon dioxide crystals.

Another feature of the present invention that enhances the efficiency of the apparatus 10 is a heat exchange chamber 54, preferably located in upper shell portion 32, shown most clearly in FIG. 5A. Disposed within the heat exchange chamber 54 is an interior portion of the inlet line 16 which is connected to the source of liquid carbon dioxide. This interior portion of the inlet line 16 functions as a heat exchange conduit 56, preferably comprising a thermally conductive coil 57, for example, a copper coil, that passes liquid carbon dioxide from the source 23 to the dry ice chamber 50. The thermally conductive coil 57, which is substantially surrounded by the heat exchange chamber 54, contains incoming liquid carbon dioxide that is cooled by carbon dioxide gas passing into the heat exchange chamber 54.

The heat exchange chamber 54 may be configured to provide enhanced concentration of cooling vapors around the inlet line 16, for example, around the thermally conductive coil 57 of the inlet line 16. For example, as shown, the heat exchange chamber 54 may be defined as a substantially cylindrical channel or space, bounded by an inner cylindrical wall 54a and an outer cylindrical wall 54b. The heat exchange chamber 54 is effectively sized and/or positioned to cause enhanced concentration of cool vapors around the thermally conductive coil 57. In the particular embodiment of the invention shown in FIG. 5A, the thermally conductive coil 57 passes through, and is substantially entirely located within, the cylindrical space that defines the heat exchange chamber 54. In this embodiment of the invention, cool vapors venting from the dry ice chamber 50 are effectively restricted to pass into the heat exchange chamber 54 prior to being vented from the apparatus 14.

Once the liquid carbon dioxide has passed through the coil 57, the cooled liquid subsequently enters the dry ice chamber 50 through narrow inlet 58. Due to adiabatic expansion the carbon dioxide "flashes" into carbon dioxide crystals or snow, eventually forming a relatively dense mass 59 of dry ice, for example a mass of dry ice having a density of about 55 lb per cubic foot.

Still referring to FIG. 5A, the expandable shell assembly 14 preferably further includes a venting chamber 60 at least partially circumscribing the dry ice chamber 50. The dry ice chamber 50 and venting chamber 60 are separated by the porous material 44. The porous material 44 is preferably permeable by carbon dioxide gas but substantially impermeable to carbon dioxide crystals. Therefore, the porous material 44 functions to keep solid carbon dioxide crystals within the dry ice chamber 50 while allow carbon dioxide gas to pass through the inner walls 42a and 42b and into the venting chamber 60. Once the carbon dioxide gas has passed through the porous material 44, the venting gas is directed upward in the direction of arrows 61 into the heat exchange chamber 54 where it passes over and cools the heat exchange coil 57 containing the incoming liquid carbon dioxide. The carbon dioxide gas is passed out of the apparatus 10 through a vent outlet 60a, for example a circular vent outlet 60a which may include a perforated covering 60b (shown most clearly in FIG. 1).

Figure 5B:
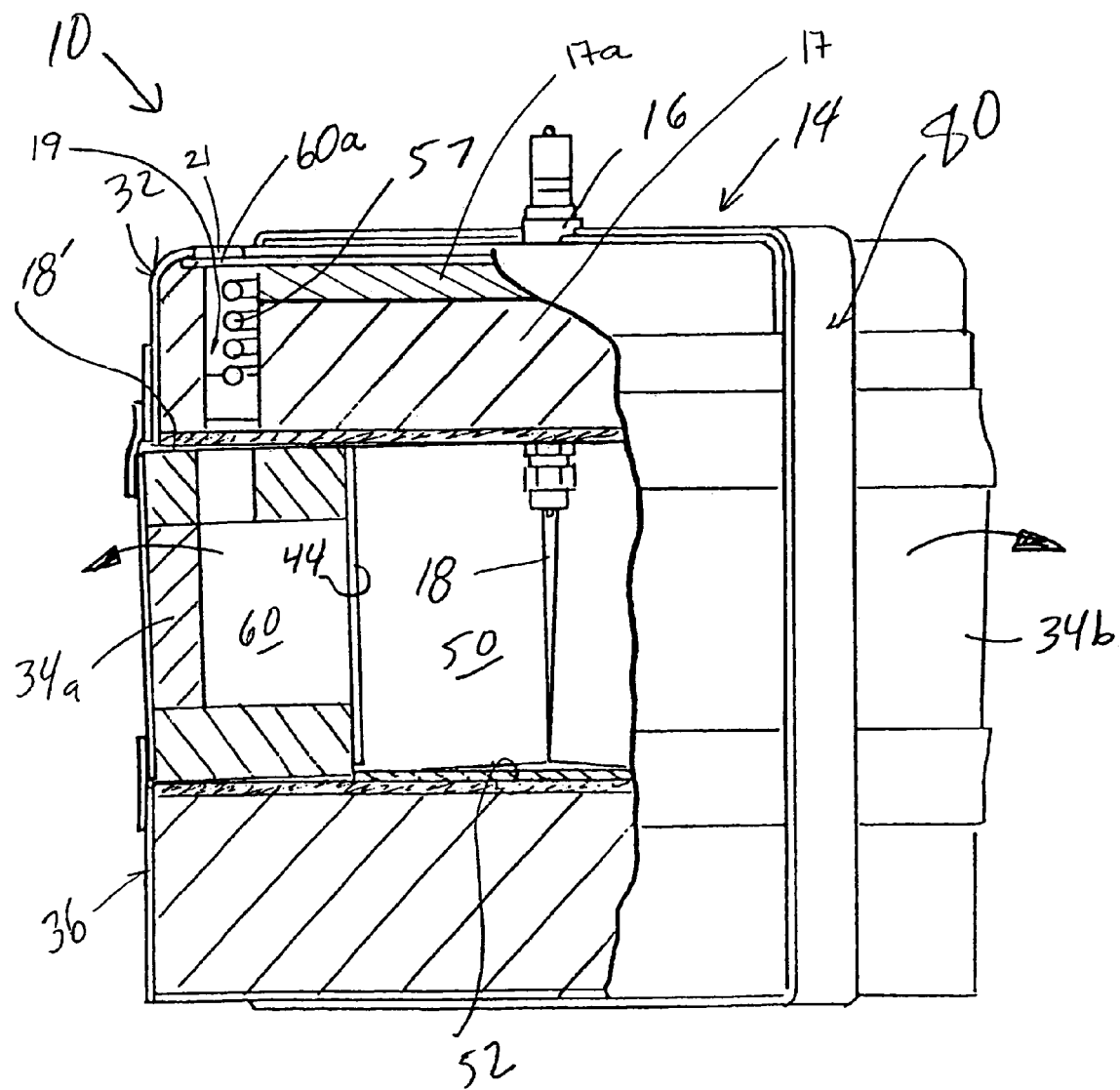
FIG. 5B is a view of the apparatus similar to the view shown in FIG. 4a, however, the expandable shell assembly has assumed a second (venting) position, allowing release of carbon dioxide gas, thereby providing a visible indication of completion of the dry ice making process.

The structure and use of this particular embodiment of the apparatus 10 of the present invention will be more clearly understood with reference to FIGS. 5A and 5B.

As shown, the expandable shell assembly 14 is preferably structured to assume a first (non-venting) position (FIG. 5A), and a second (venting) position (FIG. 5B).

Prior to use, the apparatus 10 is assembled as shown in FIGS. 5A in which the expandable shell assembly 14, including upper shell portion 32 having inlet line 16, intermediate shell subportions 34a and 34b containing the dry ice chamber 50, and base portion 36 forming a bottom surface 52 of the dry ice chamber 50. The bottom surface 52 may comprise a felt material.

Turning back briefly now to FIG. 3, it can be appreciated that shell portions 32, 34, 36, for example, shell subportions 34a and 34b, include interfacing surfaces, or interfaces 62 which form the at least one seam 18 shown in FIGS. 2, 4, 5A and 5B. It is to be appreciated that other self-relieving seams are located between other interfacing shell portions.

More particularly, the expandable shell assembly 14 seals at each seam, for example in a "gasket style" using, for example, a felt material. Turning now as well to FIG. 4, interfaces 62 and interfaces 62a (in FIG. 3) may be made of a felt material. Preferably, each of the seams between the separable shell portions 32, 34a, 34b, 36, is sealed in this manner to ensure that the buildup of carbon dioxide gas in the dry ice chamber 50 is forced through the porous material 44 and into the venting chamber 60 during the dry ice making process.

In FIG. 5B, both self relieving seam 18 and 18' are shown to be venting carbon dioxide gas from the dry ice chamber 50. For purposes of simplicity, the following description will primarily refer to the self-relieving seam 18 as being one of the seams that bisects the intermediate shell portion 34 into intermediate shell subportions 34a and 34b. However, it should be understood that the at least one self-relieving seam 18 may comprise a plurality of self-relieving seams, and may be defined by any and/or all interfaces between separable shell portions 32, 34, 36. It is also to be appreciated that the intermediate portion 34 may include a single self-relieving seam 18 on one side and a hinged portion to allow hinged opening between subportions 34a and 34b. As those of skill in the art will appreciate, as an alternative to or in addition to self-relieving seam(s) 18 of the type described above, the top shell portion or lid 32 may be formed at least partially of a material that compresses or moves upwardly (e.g., compressible rigid or flexible plastic foam) in response to the build-up of pressure within the dry ice chamber 50 such that the seam between the upper shell portion or lid 32 and the lateral shell portion(s) 34a, 34b may separate so as to allow the desired venting of carbon dioxide gas from the dry ice chamber 50. In this regard, as shown in FIG. 5B, the upper shell portion or lid 32 may comprise one or more mass(es) block of material(s) 17 and/or 17a, that is/are compressible, such that a horizontal self relieving seam 18' is formed or, alternatively or additionally, carbon dioxide gas escapes into channel 19 and through vent hole 21, when the dry ice chamber 50 becomes filled with a predetermined amount of dry ice crystals. Irrespective of where the venting of carbon dioxide gas occurs, such venting of the cold carbon dioxide gas may provide a visible vapor trail that functions as a signal to the operator that the dry ice chamber 50 has become filled with dry ice.

In FIG. 5A, the expandable shell assembly 14 is shown in a first (non-venting) position, wherein the self-relieving seam 18 is in a substantially closed position that allows a relatively small or no substantial passage of carbon dioxide gas therethrough. Carbon dioxide is transferred from the open valve 25 on the carbon dioxide cylinder 23, to the inlet line 16 by means of conduit 26. As dry ice fills the dry ice chamber 50, the seam 18 stays in the closed position until a pressure is reached that will cause the seam 18 to open sufficiently to allow carbon dioxide gas to vent from the apparatus 10. This is shown in FIG. 5B, in which the expandable shell assembly 14 is shown in the second (venting) position wherein the at least one seam 18 is in a substantially open position that allows a relatively larger passage of carbon dioxide gas therethrough.

In order to maintain the expandable shell assembly 14 in the first position while the dry ice chamber 50 fills with carbon dioxide crystals and carbon dioxide gas, the apparatus 10 preferably further comprises an expansion control assembly 80. Generally, the expansion control assembly 80 is structured to control movement of the expandable shell assembly 14 from said first position to said second position by maintaining the expandable shell assembly 14 in the first position during the filling of the dry ice chamber with solid and gaseous carbon dioxide, and by allowing the expandable shell assembly to transition, to the second position upon a predetermined pressure being reached in the dry ice chamber 50.

In the embodiment of the invention shown in FIGS. 5A and 5B, the expansion control assembly 80 comprises at least one fastening member 84 that is suitable for securing and maintaining the expandable shell assembly 14 in the first position. Preferably, the fastening member 84 comprises a set of hook and loop fastening members disposed along at least a portion of the at least one self-relieving seam 18.

Turning back now to FIGS. 1 and 2, the expansion control assembly 80 is shown as an arrangement of removable, hook side Velcro 7 strips 86 circumscribing the expandable shell assembly 14 and corresponding loop side Velcro® members 88 at least partially covering the expandable shell assembly 14. Advantageously, the loop side Velcro® members 88 provide thermal insulation and impact protection to the apparatus 10, thus, in some embodiments of the invention, a majority of the expandable shell assembly 14 may be covered with this soft, easy to handle, protective material.

Preferably, the fastening member 84 covers the at least one self relieving seam 18, and may cover each seam between all or most of the separable shell portions 32, 34, 36. For example, adjacent shell portions of the expandable shell assembly 14 may include coverings made of a "looped surface" of a Velcro® fastener.

Other alternative fastening members 84 are contemplated by the present invention. For example, the fastening member 84 may alternatively or additionally comprise suitable adhesives, clips, frangible paper or plastic members, and elastic members. For example, the expansion control assembly 80 may comprise one or more elastic bands secured about the expandable shell assembly 14.

Turning back now to FIGS. 5A and 5B, during the dry ice making process the expansion control assembly 80, including hook side members 86 and loop side members 88 hold together and maintain the seams, for example, seams 18 and 18' in the first (substantially non-venting) position, although there may be some pulling apart of the seam or negligible separation as pressure in the expandable shell assembly 14 increases. Generally, carbon dioxide gas, during this dry ice formation stage, is venting in small amounts through the vent outlet 60a.

Once pressure within the expandable shell assembly 14 increases and reaches a level in which dry ice is occupying a significant portion of the dry ice chamber 50 and building carbon dioxide gasses can no longer be adequately released through the vent outlet 60a, the separable shell portions 32, 34, 36 begin to be forced apart.

More particularly, as the dry ice chamber 50 fills with dry ice, it will reach a point where the chamber 50 is nearly 100% full. At that point the very high pressure of the liquid carbon dioxide pressurizes the relatively incompressible solid Abrick@ or mass 59 of dry ice. The pressure in the dry ice chamber 50 rises until the fastening members 84 are stretched or pulled and allow the seam 18 to slightly open as shown in FIG. 5B. The expansion control assembly 80 stretches and eventually allows the seam 18 to separate wherein the expandable shell assembly 14 transitions to the second (venting) position shown in FIG. 5B, thereby allowing a substantial amount of carbon dioxide gas to escape from the venting chamber 60 through the opened seams 18, 18'. Advantageously, the nature of carbon dioxide gas and the rapid release thereof when the apparatus 10 has transitioned to the second position, provides a visible indication to a user that the dry ice making process is complete or at least substantially reaching completion. Consequently, the release of this carbon dioxide gas relieves pressure within the dry ice chamber and prevents bursting thereof. The visible release of carbon dioxide gas through the self relieving seam(s) at the right moment provides a highly useful, highly reliable indication to a user that the dry ice making process is complete.

At this point, the valve 25 on the carbon dioxide cylinder 23 can be turned off. The fastening members 84 can be disconnected or removed from the apparatus 10 and the separable shell portions 32, 34, 36 may be separated to reveal the mass of dry ice 59 therein. Alternatively, a majority of the apparatus 10 can be left to remain on the dry ice mass 59 in order to obtain a one-time use cooling product containing dry ice. Advantageously, the apparatus 10 containing the mass of dry ice, particularly the apparatus 10 without the upper shell portion 32 containing the heat exchange coil 57, is effective as a useful cooling product in accordance with an embodiment of the present invention. In other words, upon completion of the dry ice making process, the upper shell portion 32 can be removed, leaving the remaining shell portions 34, 36 in place around the mass of dry ice 59. These remaining shell portions 34, 36 and the portion of the fastening element 88 attached thereto, are easy to handle, lightweight, and made of inexpensive materials. Thus, it can be appreciated that while the upper shell portion 32 may be reserved and kept for additional uses, the balance of the apparatus 10 may be entirely disposable and intended, for example, as a one-time use product for cooling items.

Figure 6B:
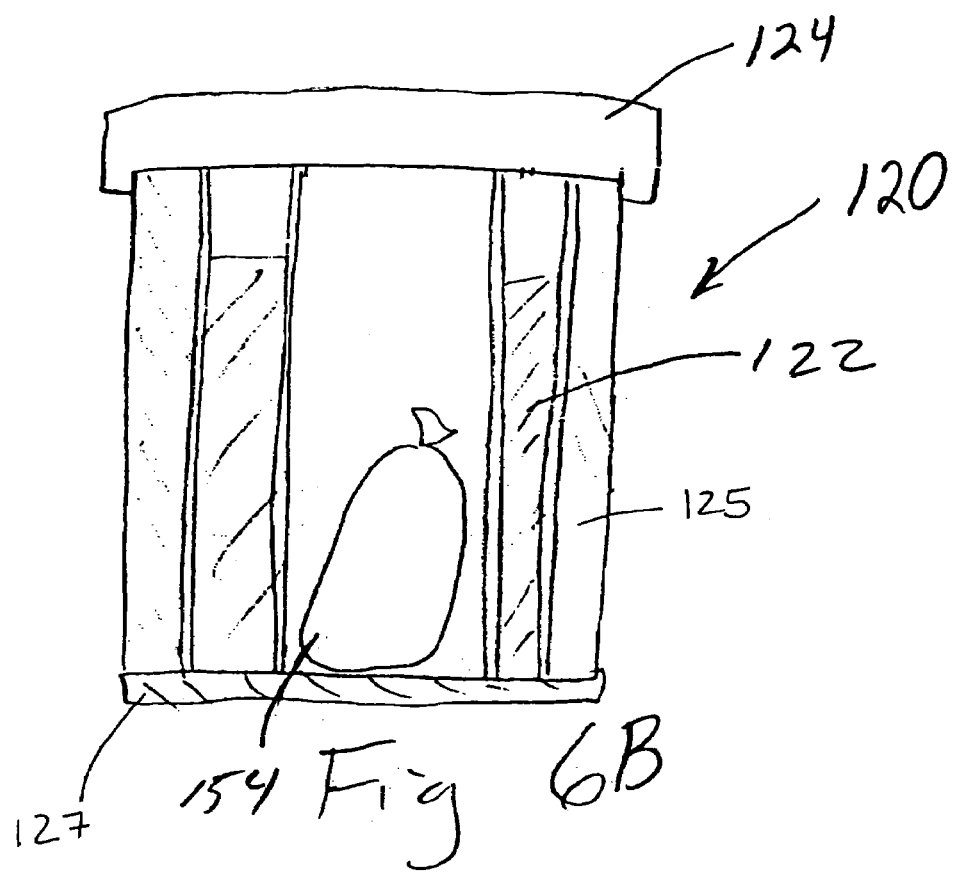
FIG. 6 is a partially cross-sectional view of a product, in accordance with yet another embodiment of the invention, containing dry ice and produced by a process in accordance with the present invention.
Figure 6A:
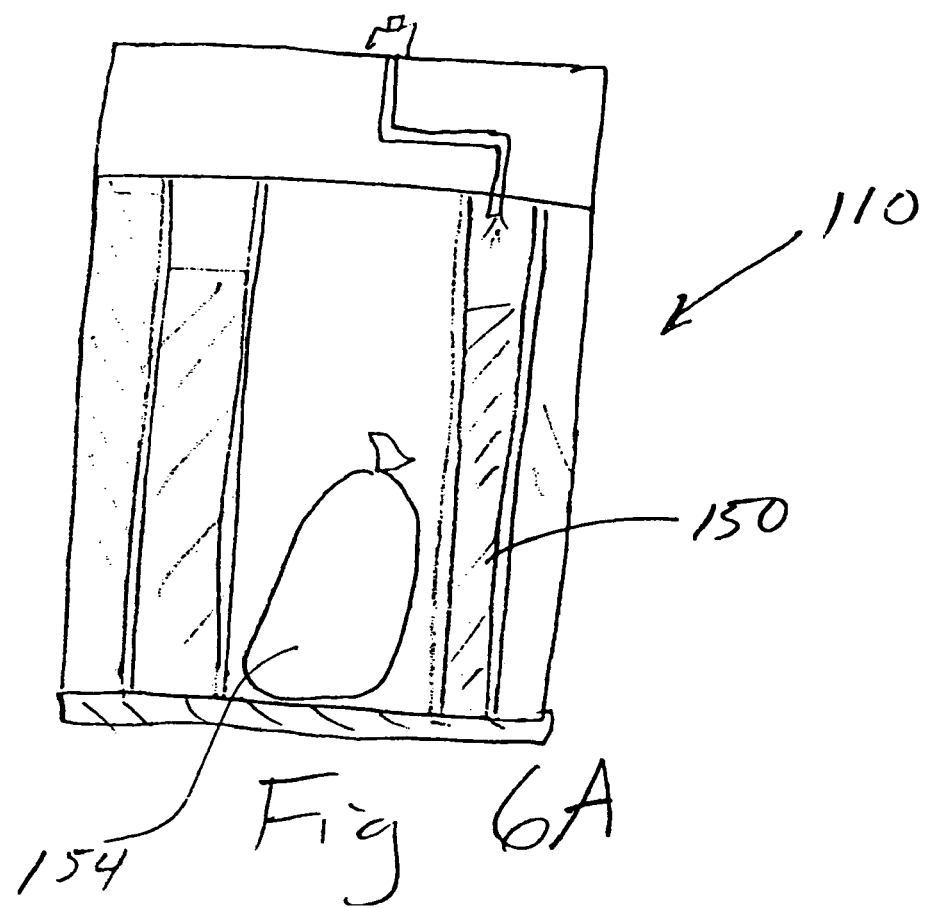

For example, referring the FIG. 6A, an apparatus 110 in accordance with another embodiment of the invention, in which a dry ice chamber 150 is provided which has a substantially cylindrical form. Apparatus 110, when containing dry ice, is suitable for holding items 154 and keeping said items 154 in a frozen or substantially frozen state. Apparatus 110 is structured in a manner identical to apparatus 10 with appropriate modifications thereto that will be understood by those of skill in the art.

Referring now to FIG. 6B, in accordance with another embodiment of the present invention, the shell portions 32, 34, 36 of the device 10 may remain in place to form an insulated container 120 wherein a quantity of dry ice 122 has been formed about an item 154 that was placed within the device prior to formation of the dry ice 122. is the container 120 may comprise one or more side wall(s) 125, a floor 127 and a lid 124. Since the item 154 is substantially surrounded by and/or encased in dry ice 122, in some applications, this container may be shipped to other locations in un-refrigerated transport vehicles while the item 154 remains at a low temperature due to its being substantially surrounded by and/or encased in dry ice 122. Examples of potential applications for this embodiment of the invention may include shipping of perishable food stuffs or other perishable items and/or shipping of biological tissues, biological fluids, biological specimens, microbiological organisms, chemicals or other items that should be maintained in a frozen or cold state during transport. Also, this embodiment of the invention, or any other embodiment, may be used for rapid cooling of any item (e.g., item 157 on FIG. 6B) during its manufacture, fabrication, processing or repair. For example, in some manufacturing processes, it may be desirable to cold shrink, quench or otherwise rapidly cool an article (e.g., cold shrinking of a bearing onto a shaft) and this invention may be used to accomplish such cold shrinking, quenching or other rapid cooling of an article (e.g., a workpiece) by forming dry ice on, in or around the article (e.g., workpiece).

The present invention further provides a method of making a useful product or article containing dry ice, for example the product 120 shown in FIG. 6B.

In one embodiment of the invention, a method for making a product containing dry ice comprises providing an expandable shell assembly such as described and shown herein, the expandable shell assembly being constructed to alternately assume a first closed, or non-venting position, and a second open, or venting position, and passing a flow of liquid carbon dioxide into the chamber while the expandable shell assembly is in said first position.

The method further comprises allowing the liquid carbon dioxide to form carbon dioxide crystals within the chamber, allowing the carbon dioxide crystals to fill the chamber, until a desired volume of carbon dioxide crystals is reached therein, and allowing pressure to increase in the chamber by maintaining the expandable shell in said first position until the desired volume of carbon dioxide crystals is reached in the chamber. The method may further comprise the step of, upon the desired volume of carbon dioxide crystals being reached in the chamber, allowing the expandable shell assembly to be automatically moved to a second position in which a relatively larger passage of carbon dioxide gas is vented from the apparatus, and thereafter terminating the step of passing the flow of liquid carbon dioxide into the chamber in order to obtain a product or article containing dry ice.

Figure 7:
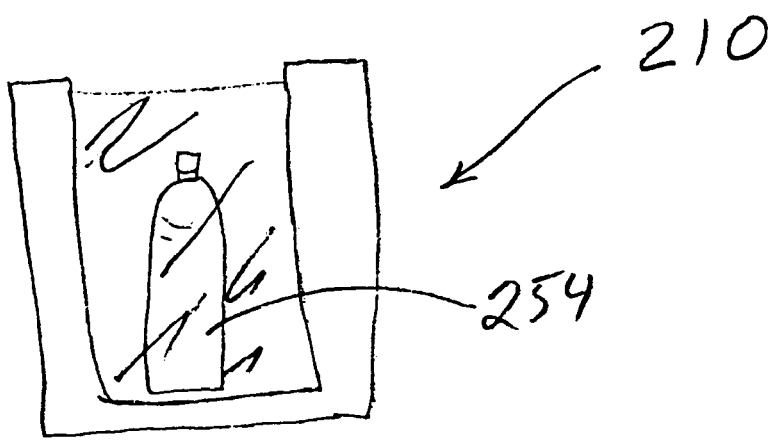
FIG. 7 is a partially cross-sectional view of a product, in accordance with yet another embodiment of the invention, encapsulated in dry ice and produced by a process in accordance with the present invention.

Referring now to FIG. 7, the present invention further provides a product 210 to be shipped in a frozen state wherein said product 210 is substantially encapsulated by dry ice. The product 210 is preferably produced by a process comprising the steps of providing a device wherein the device comprises the apparatus 10 described hereinabove.

For example, an item 254 to be encapsulated is placed in the into the dry ice chamber and liquid carbon dioxide is introduced carbon dioxide into the dry ice chamber until a mass of carbon dioxide crystals forms around the item. The remaining steps of the process include allowing buildup of carbon dioxide gas and carbon dioxide crystals within the dry ice chamber until the expandable shell assembly transitions to a position (for example the second position described hereinabove) and carbon dioxide gas is vented from the at least one self-relieving seam.

In addition, the process may include the step of observing the expandable shell assembly transitioning to the second position, preferably using no conventional pressure gauges during the observation step. Finally, the process includes terminating the step of introducing liquid carbon dioxide into the dry ice chamber and removing from the expandable shell assembly the item encapsulated in dry ice.

While this invention has been described with respect to various specific examples and embodiments, it is to be understood that the invention is not limited thereto and that it can be variously practiced within the scope of the following claims.

What is claimed is:

1. Apparatus for producing dry ice, the apparatus comprising:

a self-venting shell assembly that comprises a plurality of separable shell portions having interfaces therebetween, said shell portions being assembled to form a dry ice chamber having an inner surface and at least one vent that is alternately disposable in a non-venting position and a venting position, said vent comprising a seam between two portions of the self-venting shell assembly, said dry ice chamber being constructed such that the vent will shift from its non-venting position to its venting position when a desired amount and/or density of dry ice has formed within the chamber;

a delivery system including an inlet line for delivering liquid carbon dioxide from a supply of liquid carbon dioxide to the dry ice chamber; and a release control member which maintains said at least one vent in its non-venting position until pressure within the chamber exceeds a release pressure which indicates that the desired amount and/or density of dry ice has formed within the chamber, whereupon said release control allows said at least one vent to transition to its venting position.

2. An apparatus according to claim 1 wherein the apparatus is structured such that there is no gauge connected between the self-venting shell assembly and the delivery system.

3. An apparatus according to claim 1 wherein the self venting shell assembly is structured such that, when the vent is in its non-venting position, little or no carbon dioxide gas will pass through the vent.

4. An apparatus according to claim 1 further comprising a heat exchange chamber, disposed within the shell assembly and surrounding at least a portion of the inlet line, for cooling the inlet line with carbon dioxide gas from the dry ice chamber.

5. An apparatus according to claim 4 wherein the heat exchange chamber comprises a generally cylindrical space configured to concentrate cooling vapors around the inlet line.

6. An apparatus according to claim 5 wherein the heat exchange chamber is defined between an inner cylindrical wall and an outer cylindrical wall.

7. An apparatus according to claim 1 wherein the delivery system comprises a thermally conductive conduit disposed within the shell assembly and positioned to be exposed to carbon dioxide gas venting from the dry ice chamber.

8. An apparatus according to claim 1 further comprising a venting chamber disposed within the shell assembly and structured to vent carbon dioxide gas from the dry ice chamber.

9. An apparatus according to claim 8 wherein the venting chamber includes a plurality of ribs radially disposed around a circumference of the dry ice chamber, said plurality of ribs defining a plurality of venting passageways therebetween.

10. An apparatus according to claim 9 wherein at least some of the venting passageways extend along substantially an entire length of the dry ice chamber.

11. An apparatus according to claim 8 further comprising a porous media disposed between the dry ice chamber and the venting chamber.

12. An apparatus according to claim 11 wherein the porous media comprises a media permeable to carbon dioxide gas and substantially impermeable to solidified carbon dioxide crystals.

13. An apparatus according to claim 1 wherein the expansion control assembly comprises a fastening member disposed along the at least one self-relieving seam.

14. An apparatus according to claim 13 wherein the fastening member comprises a hook and loop fastening system extending along at least a portion of the at least one self-relieving seam.

15. An apparatus according to claim 1 wherein the plurality of separable shell portions comprises an upper portion containing a heat exchange chamber and an intermediate portion containing the dry ice chamber.

16. Apparatus for producing dry ice, the apparatus comprising:
a self-venting shell assembly that comprises a plurality of separable shell portions, said shell portions being assembled to form a dry ice chamber having an inner surface and at least one vent that is alternately disposable in a non-venting position and a venting position said dry ice chamber being constructed such that the vent comprising a seam between two of said shell portions will shift from its non-venting position to its venting position when a desired amount and/or density of dry ice has formed within the chamber; and
a delivery system including an inlet line for delivering liquid carbon dioxide from a supply of liquid carbon dioxide to the dry ice chamber;
wherein the plurality of separable shell portions comprises an upper portion containing a heat exchange chamber and an intermediate portion containing the dry ice chamber; and wherein said seam is disposed between the upper portion and the intermediate portion.

17. An apparatus according to claim 16 wherein the intermediate portion comprises at least two subportions divided by another self-venting seam.

18. An apparatus according to claim 15 wherein said seam comprises a self-relieving seam bisecting the intermediate portion of the expandable shell assembly.

19. An apparatus according claim 1 or 16 wherein the shell assembly is made substantially entirely of disposable materials.

20. Apparatus for producing dry ice, the apparatus comprising:
a source of liquid carbon dioxide; and
a shell assembly that comprises an inlet line connected to said source, a dry ice chamber in communication with the inlet line, and at least one vent that releases carbon dioxide gas from the dry ice chamber after a desired amount or density of dry ice has formed within the chamber;
there being no pressure gauge between the shell assembly and the source of liquid carbon dioxide;
wherein the shell assembly is structured to assume a first position wherein the vent is substantially closed such that it allows a relatively small or no passage of carbon dioxide gas therethrough and a second position wherein the vent is substantially open such that it allows a relatively larger passage of carbon dioxide gas therethrough; and
wherein the apparatus is structured to control movement of the shell assembly from said first position to said second position by maintaining shell assembly in the first position during the filling of the dry ice chamber with solid and gaseous carbon dioxide and by then allowing the shell assembly to transition to the second position upon a predetermined pressure being reached in the dry ice chamber.

21. An apparatus according to claim 20 further comprising a heat exchange chamber, disposed within the expandable shell assembly, for cooling the inlet line with carbon dioxide gas from the dry ice chamber.

22. An apparatus according to claim 20 wherein the delivery system comprises a thermally conductive conduit disposed within the shell assembly and positioned to be exposed to carbon dioxide gas venting from the dry ice chamber.

23. An apparatus according to claim 20 further comprising a venting chamber disposed within the shell assembly and structured to direct carbon dioxide gas from the dry ice chamber.

24. An apparatus according to claim 23 wherein the venting chamber includes a plurality of ribs radially disposed around a circumference of the dry ice chamber, said plurality of ribs defining a plurality of venting passageways therebetween.

25. An apparatus according to claim 24 wherein the plurality of ribs and the plurality of passageways are disposed along substantially an entire length of the dry ice chamber to allow effective venting of carbon dioxide gas during filling of the dry ice chamber.

26. An apparatus according to claim 23 further comprising a porous media disposed between the dry ice chamber and the venting chamber.

27. An apparatus according to claim 26 wherein the porous media comprises a media permeable to carbon dioxide gas and substantially impermeable to solidified carbon dioxide crystals.

28. An apparatus according to claim 23 wherein the venting chamber comprises at least one self-relieving seam and wherein the apparatus further comprises a fastening member disposed along the at least one self-relieving seam.

29. An apparatus according to claim 28 wherein the fastening member comprises a hook and loop fastening system extending along at least a portion of the at least one self-relieving seam.

30. An apparatus according to claim 20 wherein the shell assembly comprises a plurality of separable shell portions.

31. An apparatus according to claim 30 wherein the plurality of separable shell portions comprises an upper portion containing a heat exchange chamber and an intermediate portion containing the dry ice chamber.

32. An apparatus according to claim 29 wherein the at least one self-relieving seam is disposed between the upper portion and the intermediate portion.

33. Apparatus for producing dry ice, the apparatus comprising:
a source of liquid carbon dioxide; and
a shell assembly that comprises; i) an inlet line connected to said source, ii) a plurality of separable shell portions including an upper portion containing a heat exchange chamber and an intermediate portion containing a dry ice chamber in communication with the inlet line, and iii) at least one self-relieving seam that releases carbon dioxide gas from the dry ice chamber after a desired amount or density of dry ice has formed within the chamber;

there being no pressure gauge between the expandable shell assembly and the source of liquid carbon dioxide; and wherein the intermediate portion of said shell assembly comprises at least two subportions divided by another self-relieving seam.

* * * * *